UNITED STATES PATENT OFFICE.

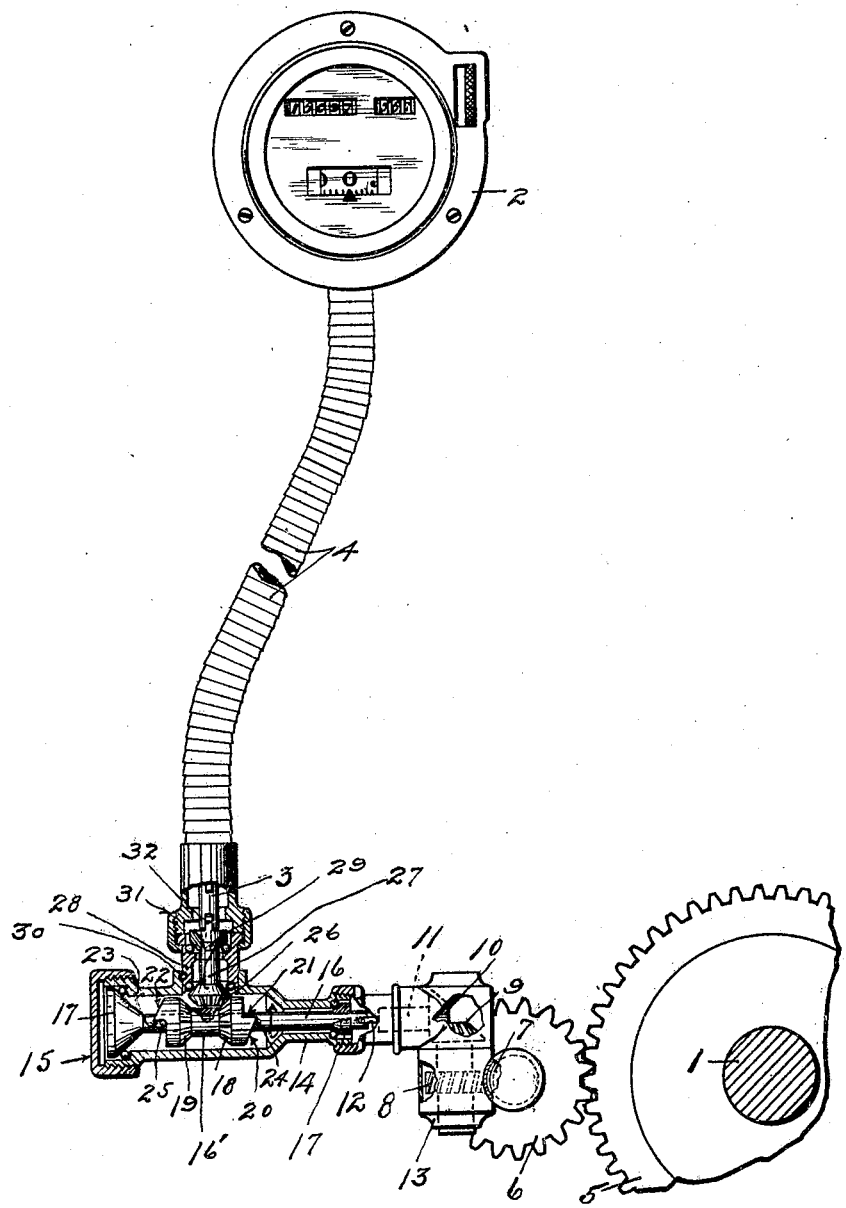

PALMER NASH, OF COLFAX, NORTH DAKOTA.

DRIVING MECHANISM FOR SPEEDOMETERS.

1,375,009. Specification of Letters Patent. Patented Apr. 19, 1921.

Application filed January 6, 1919. Serial No. 269,804.

*To all whom it may concern:*

Be it known that I, PALMER NASH, a citizen of the United States, residing at Colfax, in the county of Richland and State of North Dakota, have invented certain new and useful Improvements in Driving Mechanism for Speedometers; and I do hereby declare the following to be a full, clear, and exact description of the invention, such as will enable others skilled in the art to which it appertains to make and use the same.

My invention relates to improvements in driving mechanism for speedometers and has for its object to provide means, whereby a speedometer will be operated when the vehicle to which it is applied is moving either forward or backward.

To the above end, the invention consists of the novel devices and combinations of devices hereinafter described and defined in the claim.

The invention is illustrated in the single accompanying drawing, which is a view partly in elevation and partly in section.

The numeral 1 indicates the propeller shaft of an automobile and the numeral 2 indicates as an entirety a speedometer having a flexible driving shaft 3 mounted in a flexible casing 4. The speedometer illustrated is of the well known type, wherein, in addition to indicating the speed at which the vehicle is traveling, the mileage of a specific trip is indicated and also the total mileage for a season, and wherein means is provided for setting the trip mileage back to zero after the completion of a trip.

Secured to the propeller shaft 1, for rotation therewith, is a gear 5, which meshes with a pinion 6 carried by a supporting bracket, not shown. On the shaft of the pinion 6, is a worm 7 which meshes with a worm gear 8 having secured for rotation therewith a bevel gear 9, which meshes with a bevel gear 10. Secured to the shaft 11 of the bevel gear 10, is a link 12. The driving connections 7 to 10, inclusive, are journaled in a casing 13 comprising upper and lower sections and which connections afford a universal joint between the speedometer 2 and pinion 6.

It is now customary to connect the flexible shaft 3 directly to the link 12 to complete the driving connection from the propeller shaft 1 to the speedometer 2. With this form of driving connection, the speedometer will only be operated when the vehicle is moving forward. The parts thus far described are of ordinary or standard construction. In place of securing the gear 5 for rotation with a propeller shaft of an automobile, the same may be secured for rotation with one of the front wheels thereof, which is probably the most common method.

Referring now in detail to the invention, I interpose between the flexible shaft 3 and link 12 the hereinafter described driving connections, which automatically operate to drive the speedometer when the vehicle to which it is applied is traveling either forward or backward.

Rigidly secured to the upper section of the housing 13, is a supplemental housing 14 having at its outer end a screw cap which affords a grease cup 15. Mounted in the supplemental housing 14, is a shaft 16 having at its ends cones mounted on roller bearings which, in turn, are mounted in suitable runways formed in said supplemental housing. Said cones, roller bearings and runways are indicated, in groups, by the numeral 17. Loosely mounted on the shaft 16, is a short sleeve 16' having integrally formed with its ends a pair of bevel gears 18 and 19, which face each other. On the hub of the gear 18, is formed a cam surface 20 and a shoulder 21 and, on the hub of the gear 19, is likewise formed a cam surface 22 and a shoulder 23. It is important to note that the two cams 20 and 22 and shoulders 21 and 23 are reversely formed. Extending transversely through the shaft 16, is a pair of longitudinally spaced pins 24 and 25, the ends of which are arranged for alternate engagement with the cam surface 20 and shoulder 21 and cam surface 22 and shoulder 23, respectively.

The gears 18 and 19 are alternately moved into mesh with a gear 26, depending on the direction of rotation of the shaft 16. The gear 26 is secured to the inner end of a short shaft 27, which extends transversely of the shaft 16. On the back of the gear 26 and outer end of the shaft 27, are cones mounted on roller bearings which, in turn, are mounted in runways formed in a lateral extension 28 of the supplemental housing 14. Said cones, roller bearings and runways are indicated, in groups, by the numeral 29. It will be noted that the housing extension 28 is made separate from the supplemental housing 14, to permit the assembling of the parts therein. As shown, the inner end of the housing extension 28 is inserted into a bossed opening formed in one side of the supplemental housing 14 and secured against removal therefrom by a pin 30.

The lower end of the flexible casing 4 is detachably secured to the outer end of the housing extension 28 by a coupling 31. The lower end of the flexible shaft 3 is secured to the shaft 27, for rotation therewith, by integrally forming on said shaft a flat lug 32, which extends into the bifurcated outer end of the lowermost link of the flexible shaft 3 and is pivoted thereto.

When the shaft 16 is rotated in the direction of the arrow marked thereon, the pin 24, operating on the cam 20, imparts an axial movement to the sleeve 16' on said shaft, and thereby moves the gear 18 into mesh with the gear 26. It also moves the shoulder 23 onto the pin 25, and which shoulder and pin become the driving members between the shaft 16 and gear 18. If the direction of rotation of the shaft 16 is reversed from that indicated by the arrow heretofore mentioned, the initial reverse movement of said shaft will cause the pin 25 to move over the cam surface 22, and thereby axially move the sleeve 16' on said shaft. This axial movement of the sleeve 16' will carry the gear 18 out of mesh with the gear 26 and the gear 19 into mesh with said gear 26 and, at which time, the shoulder 21 and pin 24 will become the driving members between the shaft 16 and gear 19. Obviously, as the gears 18 and 19 automatically and alternately engage diametrically opposite sides of the gear 26, under reverse rotations of the propeller shaft 1, the gear 26 is caused to rotate in a constant direction, and thereby operate the speedometer through the flexible shaft 3, when the vehicle is moving either forward or backward.

What I claim is:—

The combination with a driving member and a driven member adapted to be rotated either forward or backward, of driving connections between said two members including a shaft, a gear, a pair of connected gears loosely mounted on the shaft with freedom for axial movement thereon, a cam surface and a shoulder on the hub of each gear of said pair, said cam surfaces and shoulders being reversely formed, and pins carried by the shaft arranged to alternately engage said cam surfaces and alternately move the gears of said pair into and out of mesh with said gear and also to alternately engage said shoulders to rotate said pair of gears with the shaft.

In testimony whereof I affix my signature in presence of two witnesses.

PALMER NASH.

Witnesses:
ROBERT A. STEVENS,
WILLIAM F. LINDNER.